Feb. 7, 1967  J. F. SAUL ET AL  3,303,264
DUAL SERVICE CONDUIT AND OUTLET SYSTEM
Filed June 29, 1964  3 Sheets-Sheet 1

INVENTORS:
JOHN F. SAUL
RICHARD A. KLINKMAN
JUNIOR WILLIAM REUSCHER
MILEY RANDOLPH PARRISH
ROBERT E. LEE

BY Gravely, Lieder + Woodruff, ATT'YS

Feb. 7, 1967    J. F. SAUL ET AL    3,303,264
DUAL SERVICE CONDUIT AND OUTLET SYSTEM
Filed June 29, 1964    3 Sheets-Sheet 2
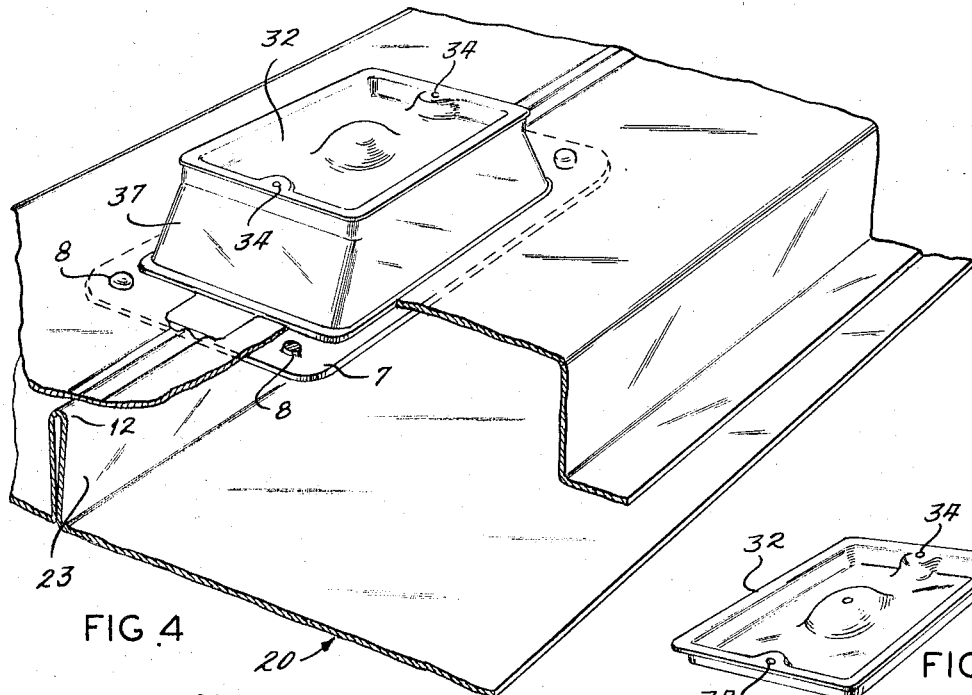
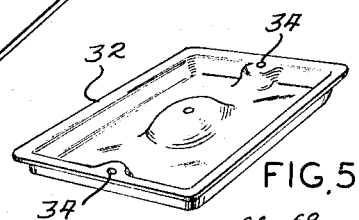
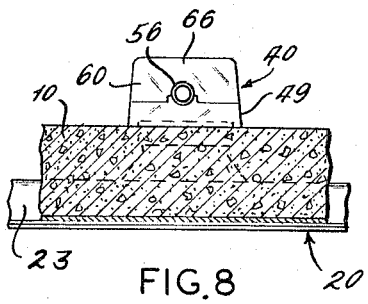
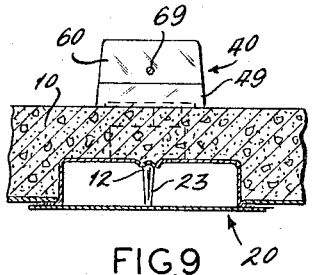
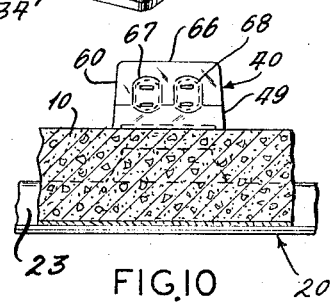
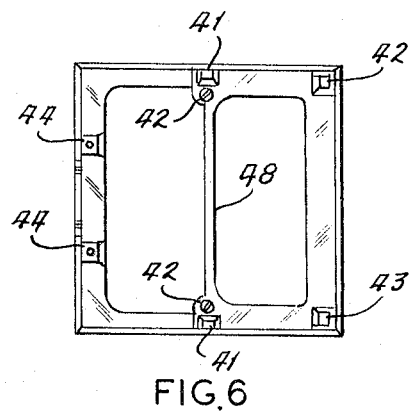

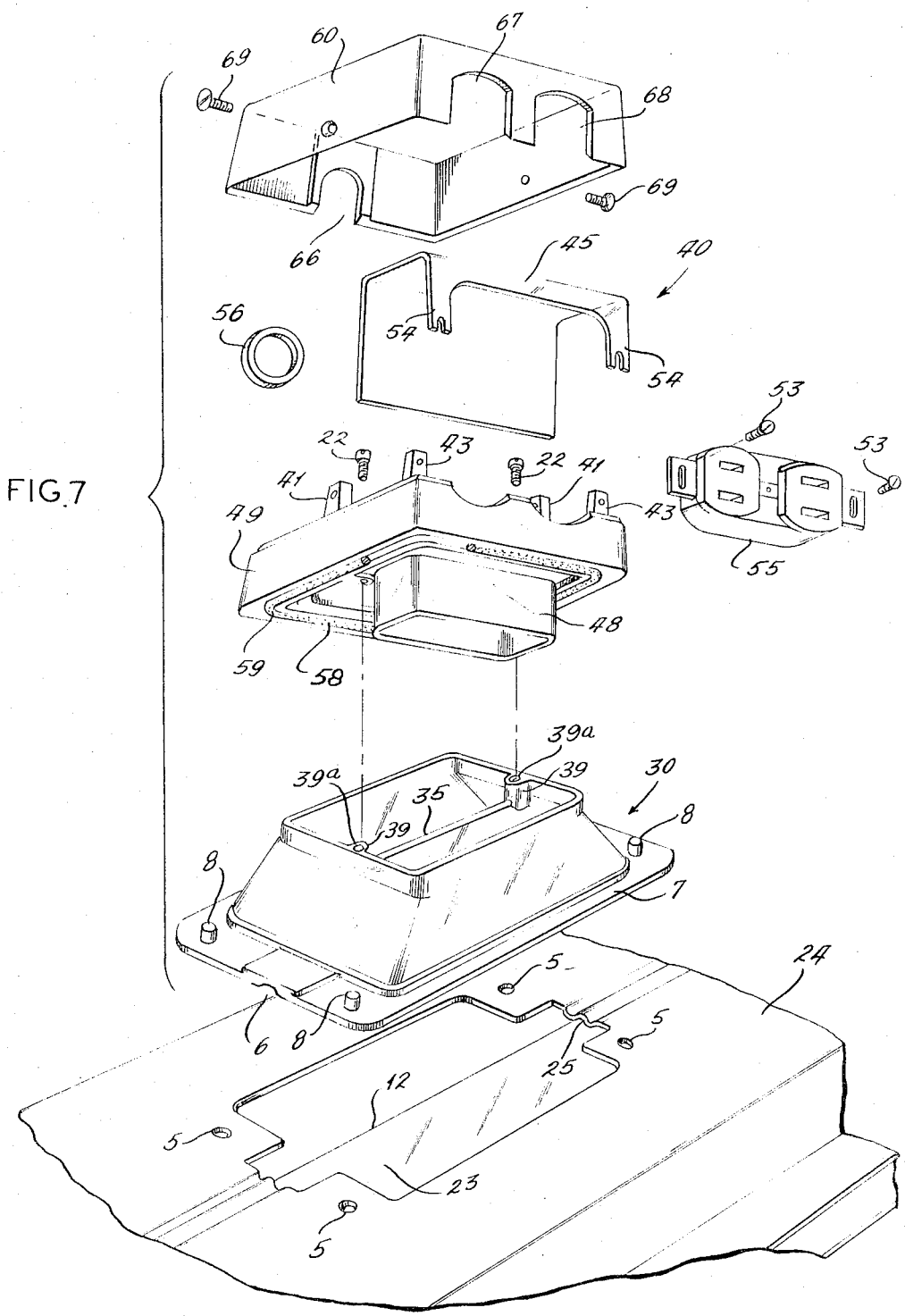

United States Patent Office 3,303,264
Patented Feb. 7, 1967

3,303,264
DUAL SERVICE CONDUIT AND OUTLET SYSTEM
John F. Saul, St. Louis, Mo., Richard A. Klinkman, New Baden, Ill., and Junior William Reuscher, Northwoods, Miley Randolph Parrish, Florissant, and Robert E. Lee, Olivette, Mo., assignors to Granite City Steel Company, Granite City, Ill., a corporation of Delaware
Filed June 29, 1964, Ser. No. 378,738
2 Claims. (Cl. 174—48)

The present invention relates to under floor dual service conduit and entrance fittings, and more particularly to under floor dual electrical service conduits and related access housings, and service outlets designed to afford centralized but separate passageways for high power and low power services.

The invention is especially adapted for use in architectural constructions wherein centralized service lines are introduced from under floor conduit networks to open floor space where access to service lines, for example, such as power and telephone, is desired at various locations throughout the floor area. The invention is particularly adapted for constructions where access is desired for a period of time in one location and then be discontinued with removal of the service outlet and restoration of the area with floor structure. Also, the invention affords the desired centralized service lines in a network under the floor in conduit readily accessible by removal of a portion of the floor in the area of an access box appertaining to the invention.

In under floor systems it is highly desirable to maintain low voltage service lines such as would be used with a telephone or buzzer or the like, and high power service lines such as would be used for operation of machinery and typewriters or desk lighting and the like, separated from one another for reasons of safety, yet retained in close proximity with ready access at the same location. Also, to achieve complete separation of the different kinds of service, it is necessary to provide access boxes and service outlets that include distinct dual cell construction. The invention disclosed herein affords these desired features in under floor dual service conduit systems.

It is therefore a principal object of the invention to provide a dual service conduit for floors in buildings such that different electrical service lines may be provided through a centralized network, but retained in distinct passageways throughout from the under floor dual conduit to the dual service outlet.

Another object of the invention is to provide an access box for use with a dual service under floor conduit in which the access box is buried under the floor surface yet whenever the surface above the access box is removed the cover to the access box may be removed to provide access into each of the separate cells or passageways of the dual service under floor conduit.

It is another object of the invention to provide an access box for a dual service under floor conduit in a network system wherein a series of access boxes are buried beneath the floor surface in a predetermined pattern with the access box covers at the start of the line and the end of the line having a flag or wire identification which extends to the surface of the floor for marking the location of such access boxes.

It is another object of the invention to provide a dual service outlet for entry through an access box into an under floor dual service conduit system in which the low voltage and high voltage cells are maintained centralized but separated by the construction of the access box and service outlet.

Still another object of the invention is to provide an access box within the under floor dual service conduit network where the box remains covered by the flooring until it is determined to provide service from said access box, after which concrete or other flooring material is removed from the top of the access box and its cover removed to provide entrance into the passageways of the dual service conduit.

It is another object of the invention to provide a dual service access box having an intermediate divider in said box and having outward flaring side walls which permit a minimum cover opening but easy wire servicing whether it be installing or removing the various service lines.

It is another object of the invention to provide an access box for an under floor dual service conduit, the conduit formed of a sheet metal member having a central wall terminating in a free margin and a cover member, channel shaped in section, having a corrugated medial margin adapted to meet with the free margin, the cover member having been cut away to permit insertion of the access box which seats on the open margin of the central wall and is readily riveted in position.

Another further object of the invention is to provide centralized yet distinct dual service in combination with an under floor dual service conduit system including an access box provided in a cutout portion of the dual service conduit that has a central divider adapted to rest on the free margin of the central wall in the dual service conduit and including a service outlet box having a skirted portion separating one side of the box from the other adapted to fit in one of the separate cells of the access box at an adjustable height above the box depending on the floor thickness above the access box, the service outlet box having a separator plate adapted for installation over the high voltage side of the outlet box, and a cover to permit access to either or both sides of the service outlet box and into the access box and the dual service conduit system.

These and other objects and advantages of the invention will become apparent along with the detailed description and appended claims in conjunction with the drawings wherein:

FIG. 4 is a perspective view, partly cut away, of the dual service conduit and access box therefor;

FIG. 5 is a perspective view of the cover for the access box;

FIG. 6 is a top view of the service outlet box illustrating the pair of separate cells provided therein;

FIG. 7 is a partly broken away exploded view of the dual service conduit, the access box and the service outlet illustrating the separate cellular structure aspect of the invention;

FIG. 8 is a cross section of the floor taken at the side of the dual service conduit to illustrate the low voltage side of the service outlet;

FIG. 9 is a cross sectional view taken through the concrete crosswise of the dual service conduit to depict an end view of the service outlet; and FIG. 10 is a cross section similar to FIG. 8 illustrating the high power side of the service outlet.

Figure 1:
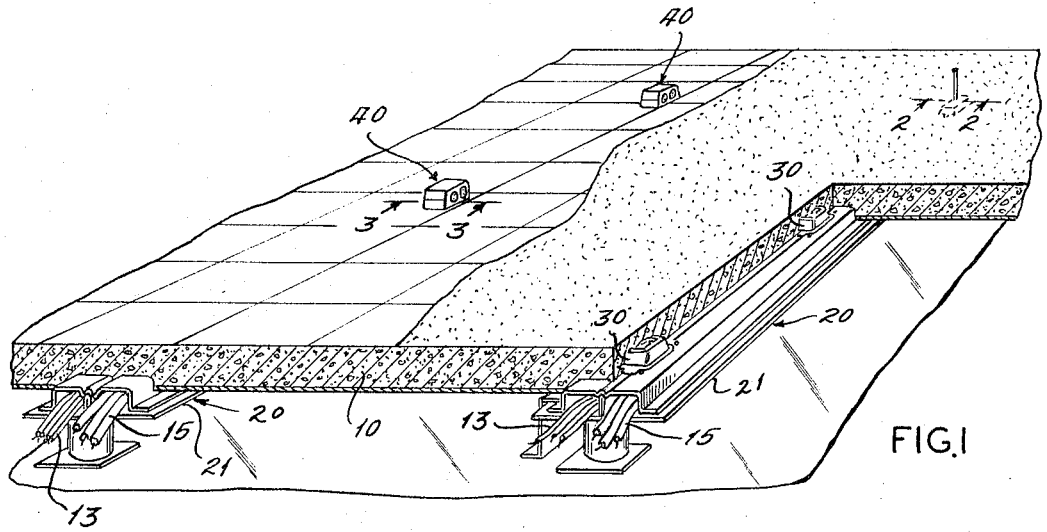
FIG. 1 is a partly broken away, perspective view of the dual service conduit system appertaining to the invention.
Figure 2:
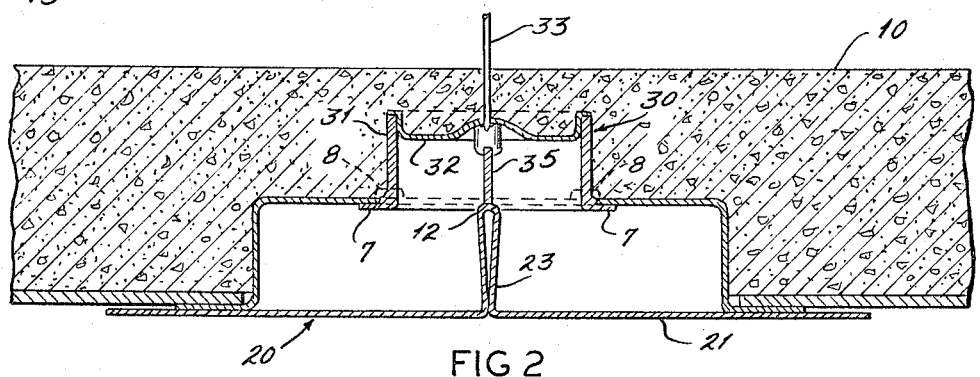
FIG. 2 is a cross sectional view taken along the line 2—2 of FIG. 1 illustrating the dual service conduit and access box attached therein.

Referring specifically to FIG. 1 there is illustrated a building floor structure 10 which includes dual service conduit 20. In the figure the cutaway portion exposes access boxes 30 beneath the surface of the floor 10 mounted within conduit 20 that provides an entrance into conduit 20. In other portions, service outlets 40 are depicted flush with the top surface of floor 10. Low power service lines 13 and high power service lines 15 are illustrated in the dual service conduit 20.

Referring specifically to FIGS. 2, 3, 4, 5, 6 and 7 the dual service conduit system will be described. The dual service conduit 20 includes a base member 21 having a central upstanding longitudinal wall 23 and a flange channel member 24. Base member 21 and channel member 24 define the dual service conduit 20. Member 24 has a medial longitudinal wrinkle 25 which mates along margin 12 of wall 23. An access box 30 consists of a base member 31 having a flange periphery 7 which includes a longitudinal groove 6. Flange 7 at each corner has a rivet 8 integral thereto. The base member 31 includes sloping walls 37 and a longitudinal divider 35. Thus, the access box 30 has separate cells. The housing 30 is provided with integral posts 39 which have countersunk and threaded apertures 39a. Member 24 of dual cell channel 20 is cut away to facilitate the installation of access box 30. Apertures 5 are provided in member 24 to receive rivets 8. The access box 30 is installed in dual cell conduit 20 with divider 35 aligned with margin 12 and groove 6 resting on margin 12. Thus, the passageways in conduit 20 are continued in separated relation into access box 30. A cover 32 having dimples 34 is adapted to seat in the top of access box 30 with dimples 34 seated over the apertures 39a of posts 39. The cover 32 is optionally fitted with a marker 33 in the central dimple thereof. When access box 30 is not to be used, and concrete or other floor surface material is to be placed over the access box 30 until it is placed in service, the marker 33 may be provided to extend to the surface of the floor structure to indicate the location of access box 30 under the structure 10 for later entrance into the dual service conduit 20. However, access box 30 always has cover 32 in place when covered over by flooring material. In the conduit system illustrated in FIG. 1 it will be observed that access boxes 30 are beneath the surface of the floor structure 10 and service outlet 40 is seated flush with the floor surface.

Figure 3:
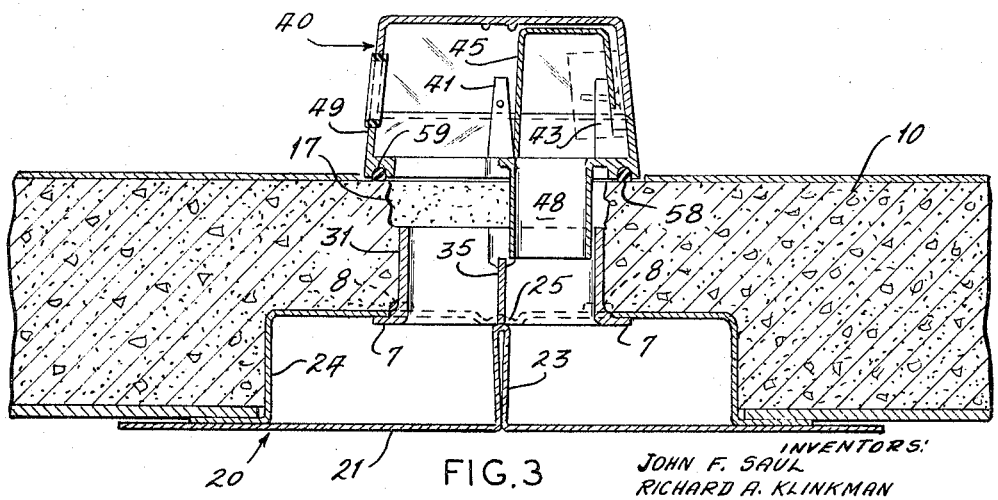
FIG. 3 is a cross sectional view taken along the line 3—3 in FIG. 1 to illustrate in cross section the dual service conduit, the access box and service outlet appertaining to the invention.

Referring now more particularly to FIGS. 3, 6 and 7 the service outlet box generally designated 40 is best seen mounted flush to floor 10 over floor cutout 17. The box has a base member 49 with a skirt or sleeve 48 depending therefrom that provides separation of the lower power service and high power service. Sleeve 48 permits installation of the service outlet 40 for the access box 30 at an adjustable height thereabove, thus allowing a variable amount of flooring material to cover the access box 30 when not in use. The base member 49 has a peripheral groove 59 in the bottom thereof which retains a gasket 58. The base member includes (as best seen in FIG. 6) apertures 42, mounting posts 41, binding post 44 and mounting studs 43. Shielding means 45 is provided to separate the base 49 of service outlet 40 into two compartments. A plug receptacle 55 is provided for attachment to posts 43 by screws 53. Shielding means 45 also is attached to posts 43 along with the plug receptacle 55 by slotted arms 54. When mounted to permit access into dual cell conduit 20, service outlet 40 is attached with gasket 58 flush to the floor surface, skirt 48 depending into access box 30 in one of the compartments thereof, and bolts 22 of appropriate length are placed in apertures 42 and threadedly received in tapped integral posts 39 of access box 30. After the appropriate electrical service has been installed for the high power side, shielding means 45 is affixed covering the high power service. The low power service may then be appropriately installed without danger of contact to the high power service. A grommet 56 is provided for the low power outlet. A cover housing 60 is provided for service outlet 40 with a cutout 66 for the low power service and a pair of cutouts 67 and 68 which fit about the face of plug receptacle 55. Grommet 56 is seated in cutout 66. Cover 60 is mounted on base 49 by bolts 69 threadedly received in posts 41.

Referring now to FIGS. 8, 9 and 10 the completely installed service outlet 40 is shown from various sides. In FIG. 8 the low power service side of outlet 40 may be observed which depicts grommet 56 in cutout 66 with cover 60 installed on base 49. Conduit 20 may be observed in its longitudinal direction. In FIG. 9 the screw 69 which attaches cover 60 onto base 49 may be seen in the cross section of concrete or flooring 10 which exposes the dual cells of conduit 20 and shows the central up standing wall 13 and margin 12 in cross section. FIG. 10 is a longitudinal section through the concrete illustrating service outlet 15 exposing plug receptacle 55 surrounded by cover 45 and exposed by cutouts 67 and 68. In FIGS. 8 and 10, the slanting walls 37 of access box 30 are depicted in phantom.

It will be appreciated that the various elements of dual service conduit system have been described and illustrated. The various features of the dual service conduit include the dual service conduit 20 having a central wall 23 which is engaged by a divider 35 in the access box 30 along the free margin 12 of central wall 23. The sloping end walls 37 permit easy movement of wires and necessary fittings within the conduit 20 and access box 30. Service outlet 40 with depending skirt or sleeve 48 affords installation of service outlet 40 at a variable height above the top of the access box 30 depending upon the floor depth at the access box. Shielding means 45 is provided to retain distinct separation between the high power and low power passageways from the dual service conduit through the exit from service box outlet 40. Thus it will be seen that the dual service conduit 20 may be utilized without the hazard of contacting the high voltage side of the system when it is desired to work solely on the low voltage side of the system.

It will be appreciated that various changes and modifications to the assemblies will become apparent to those skilled in the art and such modifications and changes as will immediately suggest themselves are deemed to be within the scope of the invention which is limited solely as necessitated by the appended claims.

What is claimed is:

1. In a dual electrical high voltage and low voltage under-floor service conduit and outlet system the improvement of: an elongated under-floor conduit member providing exterior walls and a continuous interior wall which separates the interior into adjacent elongated cellular spaces enclosed by said exterior walls by extending between two spaced opposed exterior walls, one of said two exterior walls of said conduit member having an outwardly opening access aperture that exposes said adjacent cellular spaces within said conduit member; an access box mounted on said conduit member over said aperture, said access box being open at opposite ends for access to said cellular spaces and having a divider wall therein to define two adjacent passages corresponding with and open to said elongated cellular spaces, said divider wall aligning with said interior wall to preserve the separation of the access to said cellular spaces; an outlet box mounted on an open end of said access box, said outlet box having a first portion with through openings, a sleeve portion which forms a continuation of one of said through openings and projects into one of said access box passages and the other adjacent opening communicating with the other of said access box passages and said outlet box having posts on said first portion; means to secure said outlet box to and to prevent turning of said outlet box relative to said access box; shielding means carried by said outlet box and projecting over one of said through openings to isolate the electrical services in said outlet box; high voltage plug means; threaded securing means engageable with said plug means, shielding means and said posts to secure the same in position with said shielding means forming a continuation of said sleeve portion on said first outlet box portion and a removable cover on said outlet box to enclosed said shielding means and said high voltage plug means.

2. In a dual electrical high voltage and low voltage under-floor service conduit and outlet system the improvement of: an elongated under-floor conduit member providing exterior walls and a continuous interior wall which separates the interior into adjacent elongated cellular spaces enclosed by said exterior walls by extending between two spaced opposed exterior walls, one of said two exterior walls of said conduit member being formed with an elongated wrinkle which is engaged with said interior wall to form a seal between the adjacent cellular spaces and having an outwardly opening access aperture that exposes said adjacent cellular spaces within said conduit member, and said interior wall being integral with the other of said exterior walls; an access box mounted on said conduit member over said aperture, said access box being opened at opposite ends for access to said cellular spaces and having a divider wall therein to define two adjacent passages corresponding with and open to said elongated cellular spaces, said divider wall aligning with said interior wall to preserve the separation of the access to said cellular spaces; an outlet box mounted on an open end of said access box, said outlet box having a first portion with through openings, a sleeve portion which forms a continuation of one of said through openings and projects into one of said access box passages and the other adjacent opening communicating with the other of said access box passages; means to secure said outlet box to and to prevent turning of said outlet box relative to said access box; shielding means carried by said outlet box and projecting over one of said through openings to isolate the electrical services in said outlet box; and a removable cover on said outlet box to enclose said shielding means.

References Cited by the Examiner
UNITED STATES PATENTS

| | | | |
|---|---|---|---|
| 2,073,490 | 3/1937 | Lewin | 174—81 X |
| 2,297,179 | 9/1942 | Walker | 174—48 X |
| 3,110,754 | 11/1963 | Witort et al. | 174—68 |

LEWIS H. MYERS, *Primary Examiner.*

L. E. ASKIN, H. W. COLLINS, *Assistant Examiners.*